United States Patent
Katsuda et al.

[11] Patent Number: 6,053,531
[45] Date of Patent: Apr. 25, 2000

[54] AIR BAG GAS GENERATOR

[75] Inventors: Nobuyuki Katsuda; Shogo Tomiyama, both of Himeji, Japan

[73] Assignee: Daicel Chemical Industries Co., Ltd., Osaka, Japan

[21] Appl. No.: 08/959,929

[22] Filed: Oct. 29, 1997

[30] Foreign Application Priority Data

Aug. 12, 1997 [JP] Japan .................................. 9-217841

[51] Int. Cl.⁷ .................................................. B60R 21/28
[52] U.S. Cl. ............................................................ 280/741
[58] Field of Search ............................................ 280/741

[56] References Cited

U.S. PATENT DOCUMENTS

| | | | |
|---|---|---|---|
| 3,985,076 | 10/1976 | Schneiter et al. | 102/39 |
| 5,482,316 | 1/1996 | Lang et al. | 280/741 |
| 5,492,365 | 2/1996 | Bayley et al. | 280/741 |
| 5,499,843 | 3/1996 | Faigle et al. | 280/741 |
| 5,501,487 | 3/1996 | Trevillyan et al. | 280/741 |
| 5,636,865 | 6/1997 | Riley et al. | 280/741 |

FOREIGN PATENT DOCUMENTS 0012626 6/1980 European Pat. Off. .

Primary Examiner—Kenneth R. Rice

[57] ABSTRACT

To provide a gas generator for an air bag that is designed to have a sufficient and fix seal at the area where igniting means is installed, with which a housing having a reduced weight is possible, and which manufacture is easy.

In a gas generator for an air bag composed to include a housing which has gas discharge ports, igniting means which is activated by an impact, and gas generating means which is ignited by the igniting means and burns and generates a combustion gas, a gas generator for an air bag which is made by having the igniting means provided with a cylindrical collar member used for an attachment on its outer circumference, having the housing provided with an igniting means attaching member that has a cylindrical inner circumferential surface in which the cylindrical collar member fits, having the inner circumferential surface and/or outer circumferential surface of the cylindrical collar member provided with a groove in the circumferential direction, and having the seal member attached by pressing it inside the groove.

21 Claims, 6 Drawing Sheets

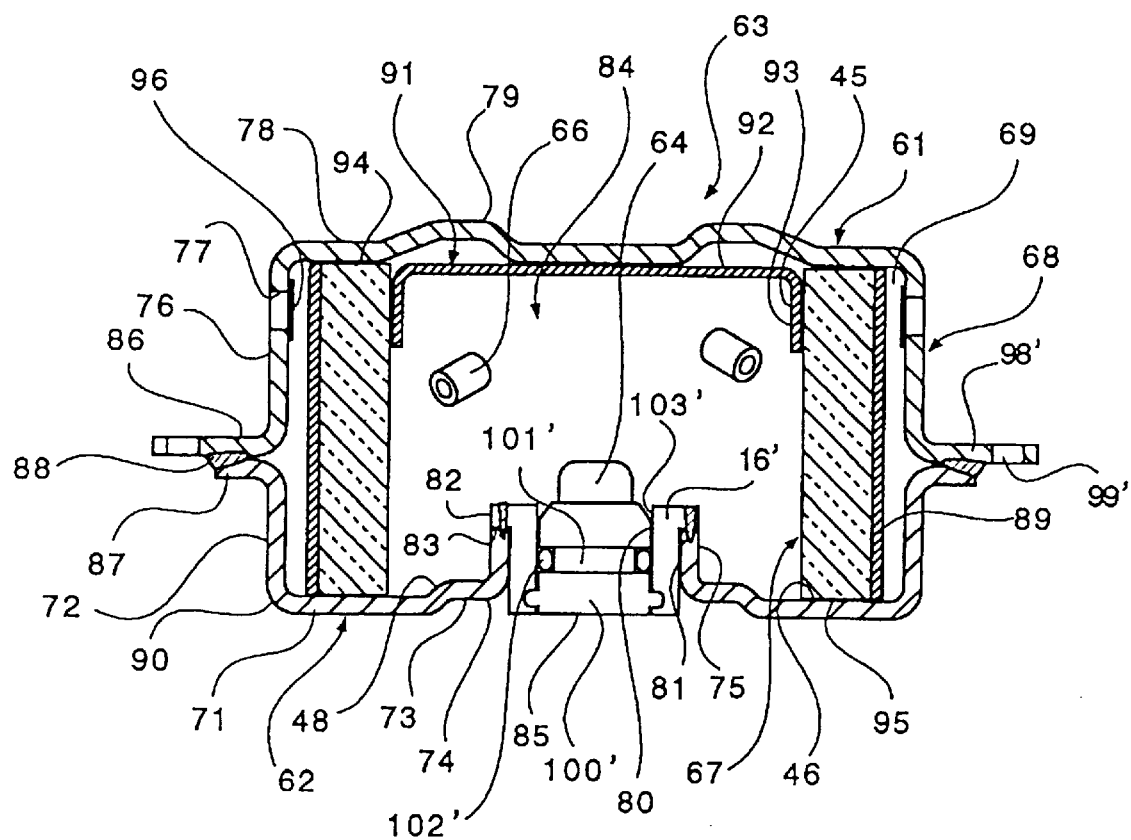
[図2]

[図 3]
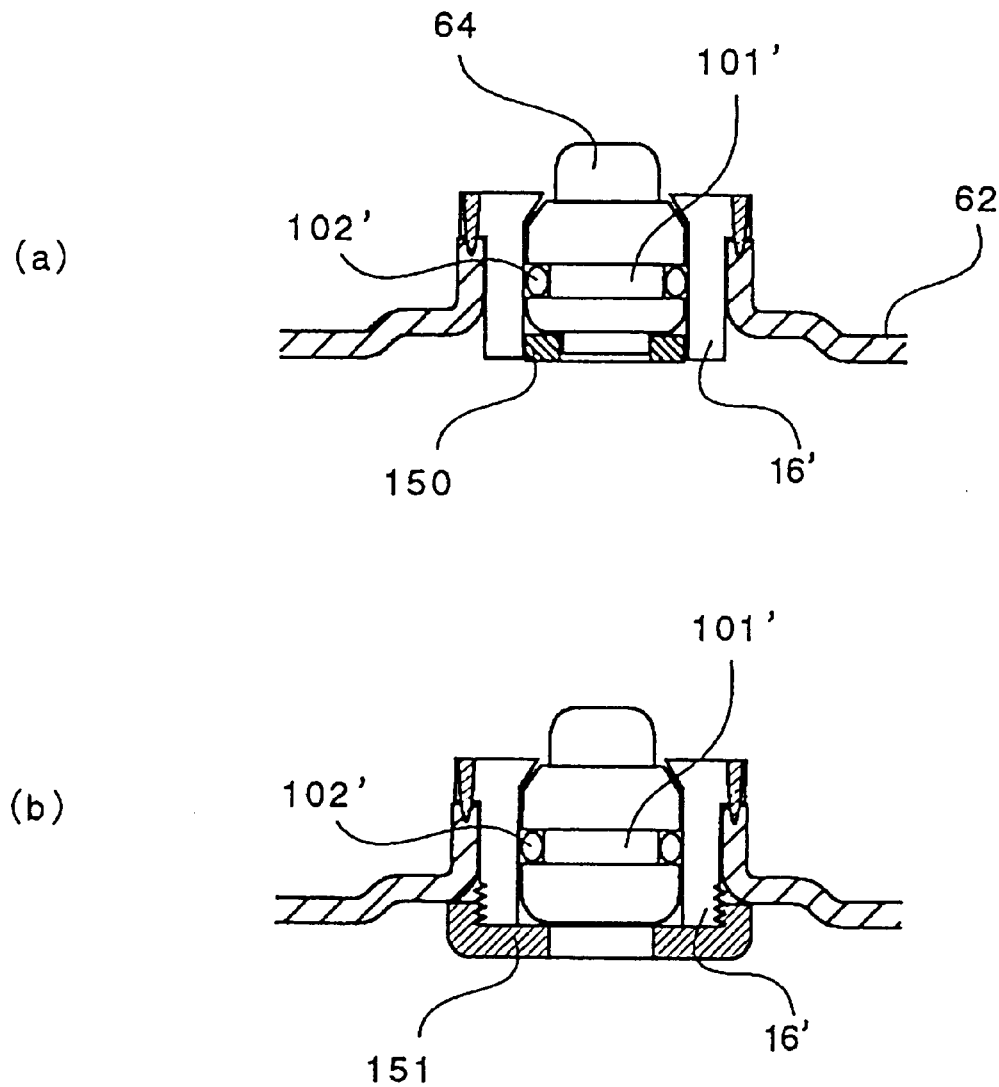
(a)
(b)

[図4]
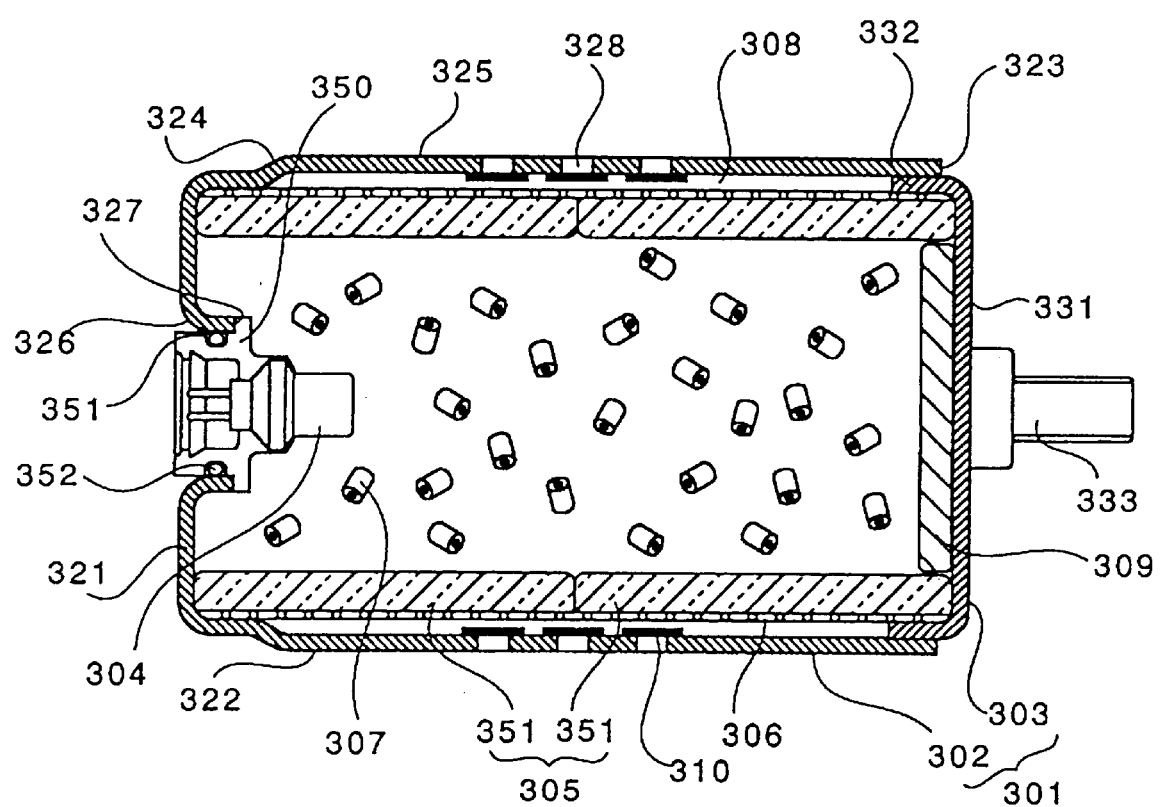

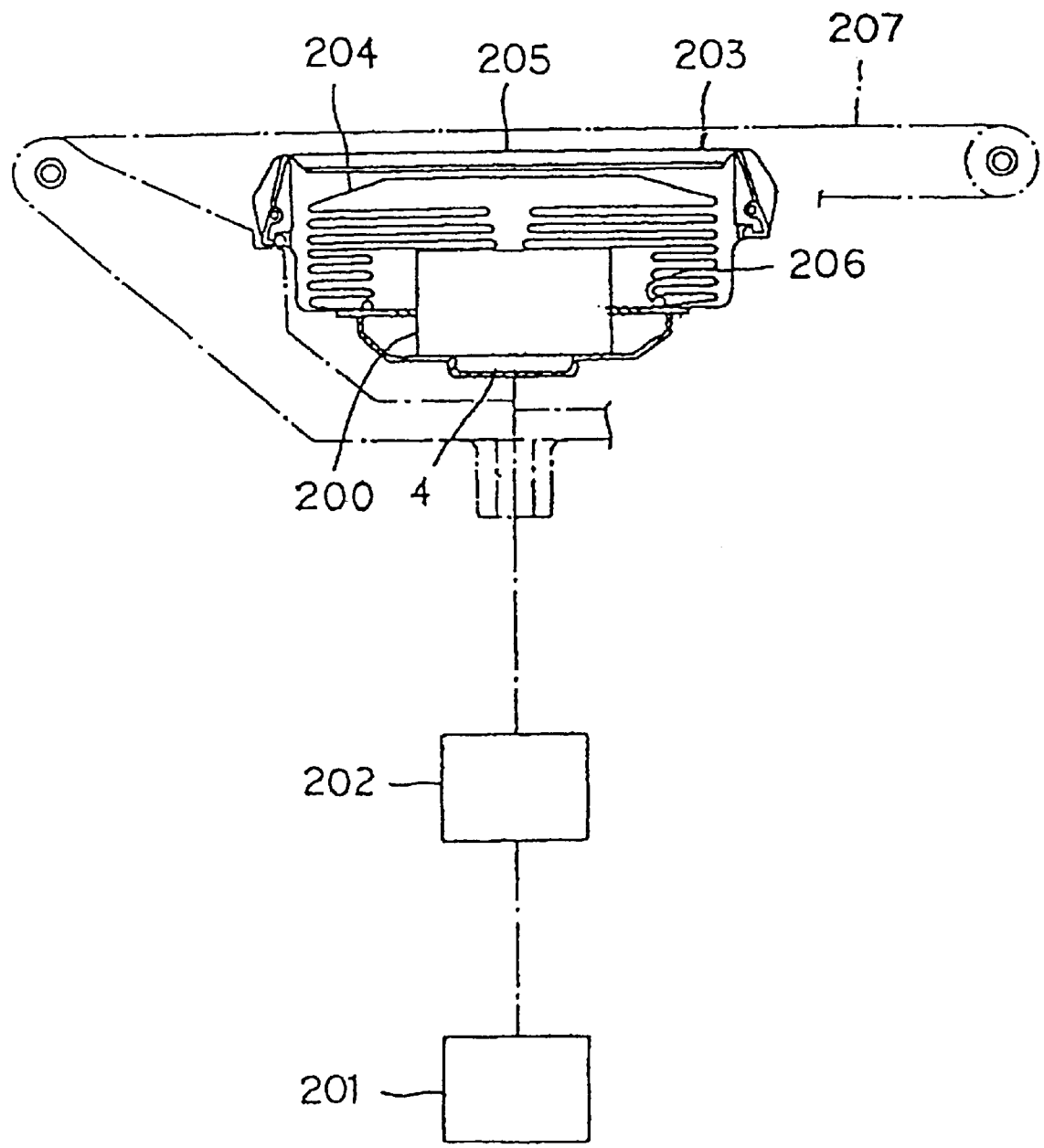

[図6]
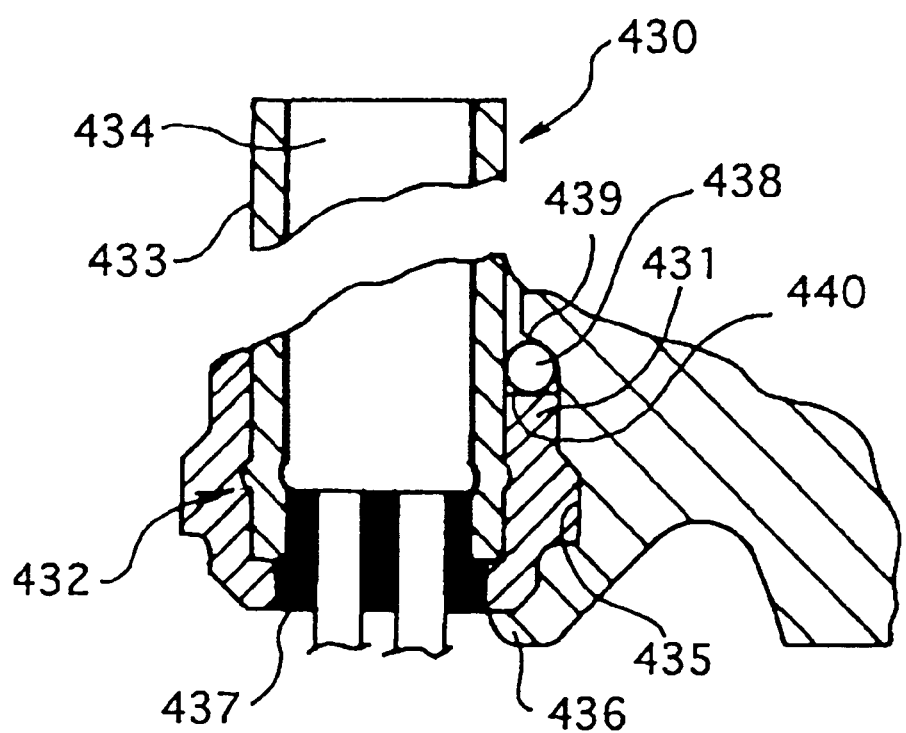

AIR BAG GAS GENERATOR

FIELD OF THE INVENTION

This invention concerns a gas generator for an air bag, which will protect passengers from impacts, and in particular a seal structure of igniting means.

DESCRIPTION OF THE RELATED ART

FIG. 6 shows a seal structure in a conventional gas generator for an air bag in the area containing igniting means. An initiator 430, which comprises the igniting means, is composed of a collar 431, a sleeve 433, which is male-female fitted 432 to said collar 431 and which opens at both ends, and a squib (igniter)/enhancer (transfer charge) 434, which is fitted into this sleeve 433. A space between this initiator 430 and the housing's hole portion 435 is sealed by means of an O-ring 438, which is provided between a step 439 at the bottom of said hole portion 435 and an end area 440, at the tip of said collar 431. Said O-ring 438 is formed of elastic material, etc., as needed. When installing this initiator 430, the O-ring 438 is inserted inside the housing's hole portion 435; then, the sleeve 433 and the collar 431 are inserted into the housing's hole portion 435 and fixed by a crimping portion 436; squib/enhancer 434 is inserted inside said sleeve 433; and after that, a sealing material 437 is poured into the space inside sleeve 433.

In the seal structure at the area which contains the igniting means in the above-mentioned conventional gas generator for an air bag, due to its structure, the hole for containing the O-ring must be formed in said housing. Therefore, it is necessary to form the area for accommodating said housing's igniting means relatively thick, which is a hindrance when trying to reduce the weight of the gas generator for an air bag. Also, when forming a gas generator for an air bag having the above-mentioned conventional seal structure, the initiator is inserted with a mere insertion of the O-ring into the hole provided in the housing. If the O-ring is unevenly inserted in the hole, the O-ring may get caught when inserting said initiator, making the sealing faulty. Thus, the installing of said O-ring and the insertion of the initiator must be done very carefully. Further, since the O-ring may get caught by the initiator to be inserted, as described above, if the O-ring is caught, it will protrude in the initiator's insertion direction. This, however, could not be verified from outside the housing.

Moreover, in the conventional seal structure, since the insertion distance, up to where the tip of the initiator passes the O-ring placement position and is contained at the normal position, is long, the O-ring may get caught when inserting said initiator, making the sealing faulty.

SUMMARY OF THE INVENTION

It is therefore the object of this invention to provide a new gas generator for an air bag that resolves the above problems present in the known technology.

In the seal structure at an area containing igniting means in a gas generator for an air bag of the present invention, a groove is formed in the circumferential direction on the inner circumferential surface and/or outer circumferential surface of the cylindrical collar member used to attach on the outer circumference of the igniting means, and a seal member, such as an O-ring or packing, etc., is provided inside said groove. By fitting this into the igniting means attaching member, the area containing the igniting means is sealed.

That is, in a gas generator for an air bag, of the present invention, including a housing having gas discharge ports, igniting means activated by an impact, and gas generating means ignited by said igniting means and burns and generates a combustion gas, is characterized by: having said igniting means provided with an attachment cylindrical collar member on its outer circumference, having said housing provided with an igniting means attaching member having a cylindrical inner circumferential surface in which said cylindrical collar member fits, having the inner circumferential surface and/or outer circumferential surface of said cylindrical collar member provided with a groove in the circumferential direction, and having the seal member attached by pressing it inside said groove.

The cylindrical collar is for installing said igniting means inside the housing, with the igniting means fitted inside the collar and the igniting means attaching member fitted outside thereof. Furthermore, in the gas generator of the present invention, on the inner circumferential surface and/or outer circumferential surface of said cylindrical collar, a groove is provided in the circumferential direction and a seal member, which will be mentioned later, is attached inside said groove. That is, for said cylindrical collar, a groove can be formed on the surface on the side where the igniting means is fitted (inner circumferential surface), or the surface on the side of the igniting means attaching member (outer circumferential surface), or on both of these surfaces.

For the seal member, an O-ring or packing, etc., can be used, and said seal member functions to seal a space created between the cylindrical collar and the igniting means and/or between the cylindrical collar and the igniting means attaching member. This seal member is able to demonstrate a sufficient seal effect when press-fitted inside the groove.

The igniting means attaching member connects the igniting means provided therein to the housing. This igniting means attaching member can be installed in the housing, for instance, by forming, at the bottom of the housing, an attachment hole which contains and fixes the igniting means attaching member, having the above-mentioned igniting means attaching member contained in said attachment hole, and securing it by welding or other conventional means. When an approximately cylindrical-shaped inner cylindrical member, one end of which joins the housing ceiling inner surface, is installed inside the housing and the inside of said housing is partitioned into two or more chambers, said inner cylindrical member can be used as the igniting means attaching member. On the other hand, when the inside of said housing is not partitioned for said igniting means attaching member, one can be used which is approximately cylindrical and whose axial length does not partition the inside of the housing into two chambers.

For the igniting means which is fitted into the abovementioned cylindrical collar, either an electric ignition type, which is activated by an electric signal transmitted from an impact sensor that senses an impact, or a mechanical ignition type, which is activated by sensing an impact exclusively by means of a mechanical mechanism, may be used.

The mechanical ignition type igniting means is composed of a mechanical sensor which senses an impact via an exclusively mechanical method, such as the firing of a firing pin via a movement of a weight, etc., a detonator which is ignited when struck by a firing pin fired from said mechanical type sensor, and then burns, and a transfer charge which is ignited and burned by the flame from said detonator. On the other hand, the electric ignition type igniting means is composed of an electric sensor which senses an impact exclusively by means of an electrical method, an igniter which is activated by an electrical signal transmitted from a sensor which senses an impact, and a transfer charge which is ignited by the activation of the igniter and then burns. For this electrical sensor, there are, for instance, a semiconductor type acceleration sensor, etc. This semiconductor type acceleration sensor has four semiconductor strain gauges formed on the silicon substrate's beam, which is designed to be deflected when acceleration occurs. These semiconductor strain gauges are bridge connected. When acceleration occurs, the beam is deflected, and the surface is strained. Because of this strain, the resistance of the semiconductor strain gauges changes, and this resistance change is detected as a voltage signal that is proportional to the acceleration. In the electrical ignition type ignition system, in particular, may involve a control unit having an ignition evaluation circuit. The signal from the above-mentioned semiconductor type acceleration sensor acts as the input to the ignition evaluation circuit; the control unit begins its calculation at the point at which this impact signal exceeds a certain value; and it outputs the activation signal to the gas generator when the calculation result exceeds a certain value.

When said igniting means is of the electrical ignition type, the igniter is fitted into the above-mentioned cylindrical collar.

In this invention when the igniting means, which activates the gas generator due to an impact, is a mechanical ignition type that does not particularly require an initiator collar, i.e., when the gas generator for an air bag is composed to include a housing which has gas discharge ports, a mechanical ignition means which is activated by an impact and a gas generating means, which is ignited by said igniting means and burns and generates combustion gas, the outer circumference of the mechanical sensor included in said mechanical ignition type igniting means has a groove provided in the circumferential direction. The area containing said igniting means can be sealed by pressing a seal member inside said groove.

In the gas generator of the present invention, if the seal structure at the area which contains the igniting means is a combination of a groove and a seal member as described above, then other structures and members required for an operation of the gas generator and structure and members advantageous for operating a gas generator may be used as needed. For the structures and members required for operating a gas generator, there are, for instance: a "housing," which is used as an enclosing container for the gas generator; a "gas generating means," which is ignited by the activation of the above-mentioned igniting means and burns and generates combustion gas; "filter means," which purifies and cools the combustion gas generated, etc. On the other hand, for the structures and members advantageously proposed for operating a gas generator efficiently, there are, for instance: an "inner cylindrical member," which is contained in the housing, and the inside is partitioned to form the igniting means storage chamber; a "filter support member," which is provided between said inner cylindrical member and the filter means, and which supports said filter means; a "short-pass preventing means (plate member, etc.)" which encloses the top end and/or bottom end of the inner circumference of the filter means and which prevents a circumstance wherein the generated gas passes through the gap between the filter means and an inner surface of the housing; a "cushion member," which is provided above and/or below the gas generating means to prevent the gas generating means from moving; a "perforated basket," which has multiple holes, and approximately cylindrical in shape, is provided on the inner side of the filter means to prevent the gas generating means from coming into direct contact with the filter means and to also protect said filter means from the flames arising from the combustion of the gas generating means; a "plenum," which is provided between the outer surface of the filter means and the inner surface of the side wall of the housing and which functions as a gas channel; etc.

The housing can be formed by casting, forging, press work, etc., and it is preferably formed by welding a diffuser shell which has gas discharge ports and a closure shell having the igniting means storage opening. The two shells can be joined by various welding methods such as: electron-beam welding, laser welding, TIG welding, projection welding, etc. When the diffuser shell and closure shell are formed by press-molding a steel sheet such as stainless steel sheets, etc., the manufacture of the two shells is easy and a reduction in manufacturing cost is achieved. Also, by forming the two shells into simple, cylindrical shapes, the press molding becomes easy. In this invention, in particular, in the seal structure at the area containing the igniting means, a groove is formed on the cylindrical collar side, and there is no need to take any special measures for the housing. Even if the housing is formed by presswork, the effectiveness of the seal at the above-mentioned area will not be affected. As for the material for the diffuser shell and closure shell, stainless steel sheets are desirable, but nickel-plated sheet steel, for example, may be used.

The gas generating means that may be used is one based on inorganic azide. This has been in wide use, in particular a sodium azide, which is an equivalent mixture of soda azide and copper oxide, or a non-azide gas generating agent. Various non-azide gas generating agent compositions have been proposed. For example, known compositions are ones primarily composed of: an organic compound containing nitrogen, such as tetrazole, triazole, or metallic salts of these compounds, etc., and an oxidizing agent containing oxygen, such as alkali metal nitrate, etc.; and compositions using, as their fuel nitrogen-source, triaminoguanidine nitrate, carbohydrazide, nitroguanizine, etc., and using, as their oxidizing agent, the nitrate, chlorate, perchlorate, etc., of an alkali metal or alkali earth metal. Any one of these, but not limited to these, may be used as the gas generating means in this invention. They are selected as needed according to the combustion rate, non-toxicity, and combustion temperature requirements. The gas generating means is used in the appropriate form, such as pellet, wafer, hollow cylinder, multiple hole, disc, etc.

The filter means, which is accommodated and installed in the housing, is in an approximately cylindrical shape and acts to remove combustion residue that is produced by the combustion of the gas generating means. The filter means also cools the combustion gas. A filter conventionally used for purifying the gas generated in a housing, and/or a coolant used for cooling the gas generated, is used; aside from these, a laminated wire mesh filter, etc., which has been formed by compression-molding an annular laminated form of wire mesh composed of the appropriate material, may also be used. More specifically, this laminated wire mesh filter can be molded by shaping plain stitch stainless steel wire mesh into a cylindrical form, forming a round laminated form by repeatedly bending one end of this cylindrical form outward, and by compression-molding this laminated form in a mold. It could also be done by shaping plain stitch stainless steel wire mesh into a cylindrical form, forming this into a sheet by pressing this cylindrical form in the radius direction, forming a laminated form by multi-rolling this sheet form into a cylindrical shape, and compression-molding this laminated form in a mold, etc. The material used for the wire mesh may be stainless steel, such as SUS304, SUS310S, SUS316 (JIS standard code), etc. SUS304 (18Cr—8Ni—0.06C) stainless steel exhibits excellent corrosion resistance as austenitic stainless steel.

A dual structure can be employed for the filter means, the inner or outer side of which has a layer composed of a laminated wire mesh form. The inner layer can have a filter means protection function to protect the filter means against the flame from the igniting means bursting toward the filter means, and protect against the combustion gas of the gas generating means being ignited by this flame and burning. The outer layer can function as a means to inhibit the expansion of the filter means so as to prevent blocking of the plenum created between the filter means and the housing's outer circumferential wall, when the filter means expands due to gas pressure when the gas generator is in operation. Incidentally, the function to inhibit the expansion of the filter means can be achieved by supporting the outer circumference of said filter means with an outer layer composed of a laminated wire mesh form, a multi-hole cylindrical form, a round belt form, etc.

The above-mentioned gas generator for an air bag is placed inside a module case along with an air bag, which is inflated by introducing a gas generated by said gas generator, to constitute an air bag system.

In this air bag system, the gas generator is activated by the impact sensor sensing an impact, and combustion gas is discharged from the gas discharge ports of the housing. This combustion gas is ejected into the air bag, and because of this, the air bag ruptures the module cover and inflates. It creates a cushion for absorbing the impact between hard structures and a passenger inside a vehicle.

In this invention, a seal member, such as an O-ring or packing, etc., is attached inside the groove provided on the cylindrical collar. This is then sealed so that there is no need to form a groove on the housing side. As a result, said housing does not have to be unnecessarily thick. Also, when providing the igniting means in the housing, it is possible to avoid said igniting means from catching the seal member, such as the O-ring, etc. Moreover, even if the O-ring, etc., comes out of the groove, this O-ring, etc., protrudes outside of the igniting means insertion hole relative to its insertion direction so that this can be easily confirmed.

Since this O-ring, etc., is fixed in said groove by contraction, it is also possible to avoid a circumstance where said seal member gets uneven when it is placed, which would result in facilitating the manufacture of the gas generator for an air bag.

Furthermore, in the gas generator of the present invention, the groove is provided on the cylindrical collar side, and then the seal member, such as the O-ring, etc., is fixed. With this structure, the cylindrical collar's insertion distance is short. Therefore, it is possible to avoid the sealing member, such as the O-ring, etc., to come out of the groove and get caught in the gap when inserting said collar.

BRIEF DESCRIPTION OF THE DRAWINGS

FIG. 2 is a vertical cross-section showing another preferred embodiment of this gas generator;

FIG. 3 is an enlarged cross-section showing the essential part of a means for securing another igniting means;

FIG. 4 is a vertical cross-section showing yet another preferred embodiment of this gas generator;

FIG. 5 is a configuration of the air bag system of this invention; and

FIG. 6 is a vertical cross-section showing the essential part of a seal structure in a conventional gas generator for an air bag.

DETAILED DESCRIPTION OF THE PREFERRED EMBODIMENTS

Figure 1:
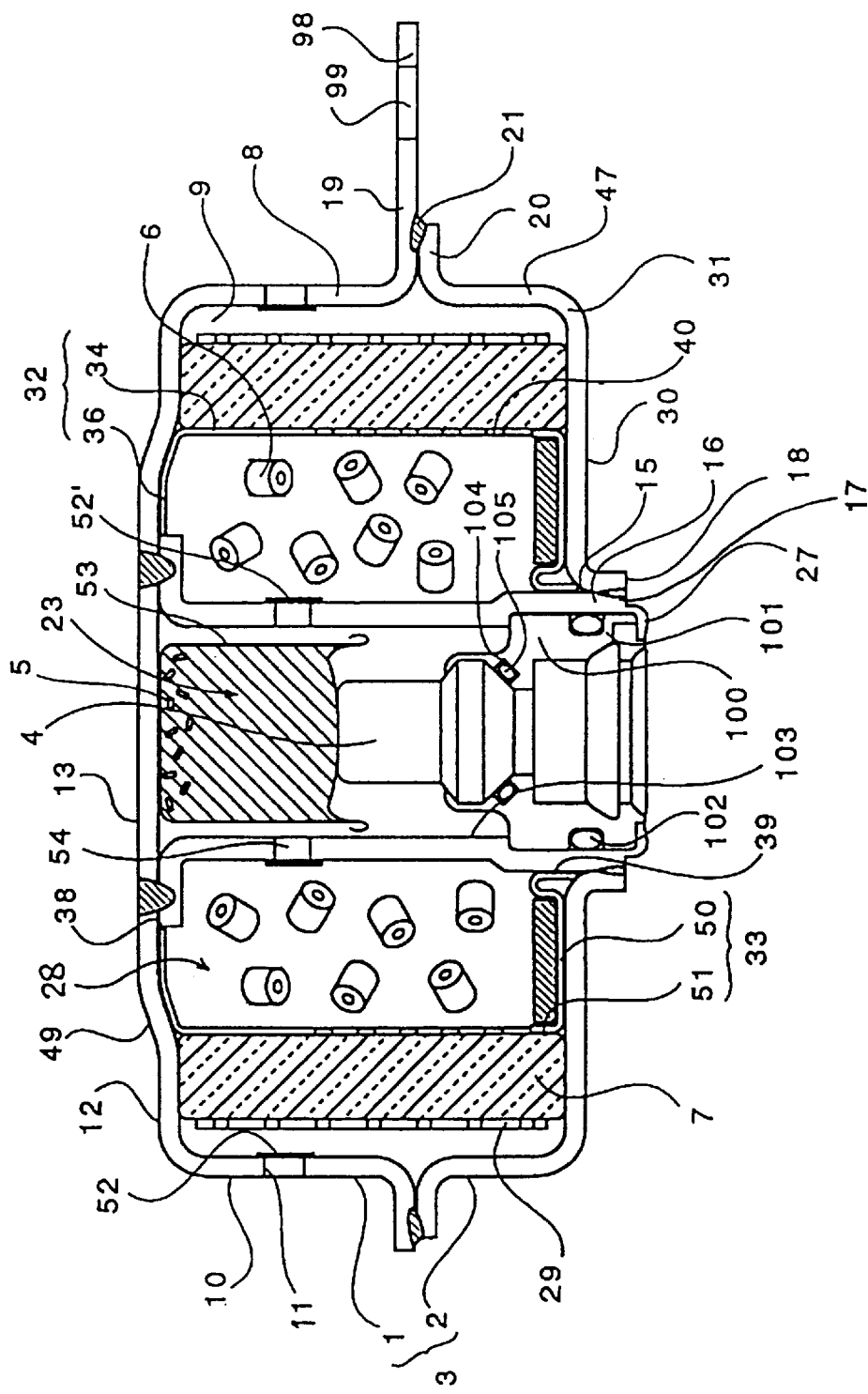
FIG. 1 is a vertical cross-section showing one preferred embodiment of this gas generator.

Preferred embodiments of this invention will be described in the following by referring to the drawings.

FIG. 1 is a cross-section of a gas generator for an air bag according to a preferred embodiment of the present invention. This embodiment is effective as a gas generator primarily with the housing having an outer diameter of about 70 mm. This gas generator includes a housing 3 which is composed of a diffuser shell 1 and a closure shell 2, an igniting means provided in a storage space in this housing 3, i.e., an igniter 4 and a transfer charge 5, a gas generating means which is ignited by the igniting means and generates combustion gas, i.e., solid gas generating agents 6, and filter means which by partitioning forms combustion chamber 28 for containing the gas generating agents 6, i.e., a coolant/filter 7.

The igniting means is provided, on its outer circumference, with attachment-purpose cylindrical collar member 100 that is provided with a groove 101 in the circumference direction on the inner circumferential surface and/or outer circumferential surface. Specifically in this embodiment, since an electrical ignition type igniting means is used as the above-mentioned igniting means, the igniter 4 is fitted inside said cylindrical collar member 100. An O-ring 102 is press-fitted inside the groove 101, which is provided on the outer circumferential surface of said cylindrical collar member 100, and fixed to the cylindrical inner circumferential surface 103 of the igniting means attaching member (central cylindrical member 16), which is provided to the housing, mentioned later. It seals the gap between said cylindrical inner circumferential surface 103 and cylindrical collar member 100. In this embodiment, a groove 104 is also formed on the inner circumferential surface of the cylindrical collar member, and an O-ring 105 is attached by press-fitting it inside said groove 104. With the combination of this groove 104 and the O-ring 105, the gap between igniter 4, which is fitted inside the cylindrical collar member 100, and the cylindrical collar member 100 is also sealed. Incidentally, the space between this igniter 4 and cylindrical collar member 100 may also be sealed without using the O-ring 105 by fitting a known sealing member, such as a gasket, etc., inside said groove. In this embodiment, the above-mentioned O-rings (102, 105) are appropriately formed using an elastic material.

Diffuser shell 1 is formed by pressing a stainless steel sheet. It has a circular area 12, a circumferential wall area 10 formed on the outer circumferential portion of this circular area 12, and a flange area 19, which is located at the tip of this circumferential wall area 10 and which extends outward in the radial direction. In this embodiment, the circumferential wall area 10 is provided with eighteen (18) gas discharge ports 11, having a diameter of 3 mm, at equal intervals in the circumferential direction. A protruding circular area 13, which protrudes outward due to a reinforced step 49, is formed at the center of the circular area 12 of this diffuser shell 1, and the reinforced step 49 functions to provide rigidity to the housing, especially to the diffuser shell circular area 12, which forms its ceiling area, and also to increase the capacity of the storage space. A transfer charge container 53, which contains the transfer charge 5, is held between the protruding circular area 13 and the igniter 4. The flange area 19 of the diffuser shell has an attachment area 98 for the attachment metal fitting of the pad module. This attachment area 98 is provided at a 90-degree interval in the circumferential direction of the flange area 19 and has attachment holes 99 for screw bolts.

Closure shell 2 is formed by pressing a stainless steel sheet and has a circular area 30, a central opening 15 formed at its center, a circumferential wall area 47 formed on the outer circumferential area of the above-mentioned circular area 30, and a flange area 20, which is located at the tip of this circumferential wall area 47 and which extends outward in the radial direction. The edge of the central opening 15 is bent in the axial direction. This bent area provides rigidity to the edge of the central opening 15 and also provides a relatively large joint face with a central cylindrical member 16. The central cylindrical member 16 is engagingly fitted into this central opening 15. An end surface 17 of one end of this central cylindrical member 16 and an end surface 18 of the bent area of the central hole edge form a single plane.

For the diffuser shell 1 and the closure shell 2, the diffuser shell's flange area 19 and the closure shell's flange area 20 overlap in the vicinity of the central cross-section in the axial direction of housing 3, and are joined by laser welding 21 to form the housing 3. These flange areas 19 and 20 provide rigidity to the housing, especially to its outer circumferential wall 8, prevent deformation of the housing due to gas pressure.

In this embodiment, the inside of the housing is partitioned to make two or more chambers by providing the central cylindrical member 16, composed of a stainless steel tube, having one flanged end, fixed to the diffuser shell's protruding circular area 13, and an open end. The central cylindrical member 16 forms an igniting means storage chamber 23 in the inside thereof and a combustion chamber 28 in the outside thereof. Inside this igniting means storage chamber 23, an igniter 4, which is activated by a signal from a sensor (not shown in the Figure), and a transfer charge container 53, into which the transfer charge 5 ignited by this igniter 4 is filled, are provided. The combustion chamber 28 is filled with gas generating agents 6. Since the igniting means are provided inside central cylindrical member 16, the above-mentioned cylindrical collar member 100, inside which the igniter 4 is fit, is also fixed to the inside of said central cylindrical member 16, i.e., a cylindrical inner circumferential surface 103. Therefore, as in this embodiment, when the igniting means storage chamber 23 is formed by partitioning with the central cylindrical member 16 provided in the housing, said central cylindrical member 16 can be used as igniting means attaching member.

The above-mentioned cylindrical collar member 100, into which igniter 4 is fitted, can be fixed by, for instance, crimping the other end of the central cylindrical member 16.

The central cylindrical member 16 is composed of a tube formed by rolling a 1.2–3.0 mm thick stainless steel sheet into a tube form and welded, and may have a 17–22 mm outer diameter. This kind of welded tube can be formed by the UO press method (the sheet is formed into a U shape, then formed into an O shape, and the seam is welded), the electrical seam tube method (the sheet is molded into a circular shape, and the seam is welded with resistance heat by applying a large electrical current while applying pressure to the seam.), etc. Aside from these, said central cylindrical member 16 can be formed by either casting, forging, or by press or cutting work, etc., or a combination of these. Also, the central cylindrical member 16 has flame transfer holes 54 on the other end's side. In this example, six 2.5 mm diameter flame transfer holes are provided at equal intervals in the circumferential direction, and said fire transfer holes 54 are closed up by a seal tape S2'.

The coolant/filter 7 is provided, surrounding the gas generating agents 6, and forms a round chamber around the central cylindrical member 16, i.e., the combustion chamber 28. This coolant/filter 7 is formed by overlaying plain stitched, stainless steel wire mesh in the radial direction, and compressing it in the radial and axial directions. This coolant/filter 7 has a shape in which loop-like stitches have been mashed down in each layer. These comprise the layer in the radial direction. Therefore, the coolant/filter's spacing structure is complex, so that this coolant filter 7 has an excellent capturing effect. In order to prevent a plenum 9 from being blocked due to the expansion of the coolant/filter 7 by gas pressure when the gas generator operates, an outer layer 29, which functions as the inhibiting means to inhibit the expansion of the coolant/filter, is formed on the outer side of the coolant/filter 7. This outer layer 29 can be formed, for instance, using a laminated wire mesh form, or using a perforated cylindrical member having a plurality of through-holes on the circumferential wall surface. When the outer layer 29 is formed using the laminated wire mesh form, said outer layer 29 can also have a cooling function. The combustion chamber 28 is formed inside the coolant/filter 7, and the coolant/filter 7 cools the combustion gas generated in the combustion chamber and collects the combustion residue.

The tilted area 31 is formed in the circumferential direction, enclosing circular area 30 of the closure shell; and this tilted area 31 functions as movement prevention means for preventing movement of the coolant/filter 7. This area 31 also functions as a means to form the plenum between the housing's outer circumferential wall 8 and the coolant/filter 7.

Many solid gas generating agents 6 are provided in combustion chamber 28. A gas generating agent 6 is a hollow cylinder in shape, and because of this shape, combustion occurs at the outer and inner surfaces. This shape has an advantage that as the combustion progresses, the surface area of the entire gas generating agent changes very little.

Between the coolant/filter 7 and the gas generating agents 6, a perforated basket 32 is provided. It protects said coolant/filter 7 from the flame and promotes effective combustion of the gas generating agents. This perforated basket 32 is composed of approximately cylindrical circumferential wall area 34 having through-holes 40 in the circumferential and axial directions, and approximately flat and circular-shaped lid area 36 which is incorporated into the top end opening on the diffuser shell side of said circumferential wall. The lid area 36 may be formed into a shape that can supplement and interrelate with the inner surface of the housing's top circular area 13 where said perforated basket 32 is provided. Furthermore, a large opening 38 may be formed at the center for passing the above-mentioned central cylindrical member 16 therethrough. The perforations 40 are formed in circumferential wall area 34, being restricted so as not to obstruct the passage of the gas generated and also to exclude areas that are exposed to the flame bursting from the flame transfer hole 54 of the central cylindrical member 16. Based on this kind of structure, said perforated basket 32 has a coolant/filter protecting function which protects the coolant/filter 7 from the flame bursting from the flame transfer hole 54 of the central cylindrical member 16, and a combustion promoting function which attempts to deflect the direction of said flame and to make the flame spread sufficiently toward gas generating agents 6. Furthermore, this perforated basket 32 is fixed to the central cylindrical member 16 by the opening 38 of the lid area 36 to prevent movement in radial direction. This structure functions as a means for positioning the coolant/filter 7 when assembling the gas generator, and also functions as a short-pass prevention means which prevents the so-called short-passing of the combustion gas. That is, the combustion gas does not pass through the coolant/filter but passes through a gap when one is created between the housing's inner surface 37 and the coolant/filter end surface 38 due to the pressure of the combustion gas when the gas generator is operated.

A plate member 33 is provided on the closure shell side, on the inner side of the coolant/filter 7. This plate member 33 is composed of a circular area 50, which closes off an opening at the bottom end of the coolant/filter 7, and a circumferential wall area 51, which is incorporated into this circular area 50 and directly contacts the inner circumferential surface of the coolant/filter. The circular area 50 has a central hole 39 which fits in the outer circumference of the central cylindrical member 16, and it directly contacts the existing gas generating agents to inhibit the movement of the gas generating agents. This plate member 33 is held between the central cylindrical member 16 and the coolant/filter 7 by elastic force, preventing the combustion gas from short-passing at the end surface in the direction of the bottom of the coolant/filter 7, and functioning as a welding protection plate at the time of welding.

The plenum 9 is formed between the housing's outer circumferential wall 8 and the coolant/filter's outer layer 29. This plenum 9 forms, around the coolant/filter 7, a gas channel whose cross-section in the radial direction is round in shape. In this embodiment, the area of the radial direction cross-section of the gas channel is constant, but it is possible to increase the area of the radial direction cross-section of the gas channel as it gets closer to gas discharge ports 11, for instance, by forming the coolant/filter into a cone shape. In this case, for the area of the radial direction cross-section of the gas channel, the mean value may be used. Area St at the radial direction cross-section of the gas channel is made greater than the total sum At of the opening area of each gas discharge port 11 of the diffuser shell. Due to the existence of the gas channel around the coolant/filter 7, the combustion gas passes through the entire region of the coolant/filter and moves toward the gas channel. Because of this, effective use of the coolant/filter and effective cooling and purifying of the combustion gas are achieved. The combustion gas, which has been cooled and purified, passes through the above-mentioned gas channel and reaches the diffuser shell's gas discharge ports 11.

Incidentally, in this example, an explanation was given, referring to an example in which a plenum is formed between the housing's outer circumferential wall and the coolant/filter, but it is acceptable not to have this space.

In order to prevent moisture from outside from entering the inside of the housing 3, the diffuser shell's gas discharge ports 11 are sealed with an aluminum tape 52.

When assembling this gas generator, the diffuser shell 1, to which the central cylindrical member 16 has been joined, is placed with its protruding circular area 13 at the bottom. The open hole 38 of the perforated basket 32 is inserted through the central cylindrical member 16. The coolant/filter 7 is fitted outside of the circumferential wall area 34 of said perforated basket, which positions the coolant/filter 7, and its inside is filled with the solid gas generating agents 6. The plate member 33 is provided over this. Next, the closure shell's central opening 15 is inserted through the central cylindrical member 16; the closure shell's flange area 20 is laid over the diffuser shell's flange area 19. Laser welding 21 and 44 are provided to join the diffuser shell 1 with the closure shell 2 and the closure shell 2 with the central cylindrical member 16. Finally, after the transfer charge container 53 is inserted into the central cylindrical member 16, the igniter 4, which was provided in the cylindrical collar member 100 where O-ring 102 was attached by pressing it inside the groove 101, is inserted, and these are fixed by the crimping area 27 of the igniter holding member. The gap between the cylindrical collar member 100 and the igniter 4 is sealed by providing the O-ring 105 by pressing it inside the groove 104 formed on the inner circumferential surface of the cylindrical collar member 100.

In the gas generator having this structure, when the sensor (not shown in the Figure) senses an impact, its signal is sent to the igniter 4 to activate it; and because of this, the transfer charge 5 inside the transfer charge container 53 is ignited and produces a high temperature flame. This flame bursts from the through-holes 54 and ignites the gas generating agents 6 near the through-holes 54 and also ignites the gas generating agents at the lower area of the combustion chamber, with its course being deflected by the circumferential wall area 34. Due to this, the gas generating agents burn and produce a high-temperature/high pressure gas; this combustion gas passes through the entire region of the coolant/filter 7, during which period it is effectively cooled and its combustion residue collected; the combustion gas which has been cooled and purified passes through the gas channel (plenum 9), ruptures the wall of the aluminum tape 52, ejects from the gas discharge ports 11, and flows into the air bag (not shown in the figure). Because of this, the air bag inflates and forms a cushion between a passenger and hard structures, protecting the passenger from the impact. The above-mentioned step 49 of the diffuser shell circular area and the above-mentioned bent area 14 of the closure shell circular area provide rigidity to the ceiling and bottom areas of the housing to prevent deformation of the housing due to gas pressure. Also, the flange areas 19 and 20, which overlap and join in the vicinity of the central cross-section in the axial direction of the housing, provide rigidity to the outer circumferential wall 8 of the housing to prevent deformation of the housing due to gas pressure. Moreover, when a gap is created at the end surface of the coolant/filter, short-passing of the combustion gas is prevented by the above-mentioned perforated basket 32 and the plate member 33.

FIG. 2 is a cross-section of another embodiment of a gas generator for an air bag, in which an inner cylindrical member is not provided in a housing and the inside of the housing consists of a single chamber. The gas generator in this embodiment is effective as a gas generator primarily with the housing having an outer diameter of about 60 mm. This gas generator includes the housing 63 which is composed of a diffuser shell 61 and a closure shell 62, an igniter 64 provided in a storage space in this housing 63, solid gas generating agents 66 which are ignited by this igniter 64 and generate the combustion gas, and a coolant/filter 67 which by partitioning forms a combustion chamber 84 for containing these gas generating agents 66. The igniter 64 is fitted into cylindrical collar member 100', and this cylindrical collar member 100', inside which said igniter 64 has been fitted, is fitted into approximately cylindrical igniting means attaching member 16'. On the outer circumferential surface of this cylindrical collar member 100', a groove 101' is formed in the outer circumferential direction, and an O-ring 102' is attached by pressing it inside said groove 101'. This O-ring 102' seals the gap between the cylindrical collar member 100' and the igniting means attaching member 16'.

The diffuser shell 61 is formed by pressing a stainless steel sheet and has a circular area 78, a circumferential wall area 76 formed on its outer circumferential area, and a flange area 86, which is located at its tip and extends outward in the radial direction. The circumferential wall area 76 is provided with gas discharge ports 77 at equal intervals in the circumferential direction. A plurality of reinforced forms 79, six in this embodiment, each having a rib shape in the radial direction, are provided radially on the circular area 78 of this diffuser shell 61. These rib-shaped reinforced forms 79 provide rigidity to the housing, especially to the diffuser shell circular area 78, which forms its ceiling area, and they prevent deformation of the housing due to gas pressure. A flange area 86 of the diffuser shell has an attachment area 98 for the attachment of a metal fitting of the pad module. This attachment area 98' is provided at a 90 degree interval in the circumferential direction of the flange area 86, and has attachment holes 99' for inserting screw bolts.

The closure shell 62 is formed by pressing a stainless steel sheet. It has a circular area 71, a circumferential wall area 72 formed on its outer circumferential area, and a flange area 87, which is located at its tip and extends outward in the radial direction. A concavity 73 is formed by step 48 at the center of the circular area 71, and a central opening 74 is formed at the center of this concavity 73. This central opening 74 has a bent area 75 at its edge, bent in the axial direction. This bent area 75 has an inner circumferential surface 81, into which a drum 80 of an igniting means attaching member 16' is fitted, and the end surface 83 where a flange 82 of the igniting means attaching member 16' is fixed. Due to the structure of the inner circumferential surface 81 of the axial direction bent area 75, a relatively large seal surface is obtained. In order to fix air tightness, a sealing material can be filled in the space between the drum 80 of the igniting means attaching member 16' and the inner circumferential surface 81. Also, the flange 82 of the igniting means attaching member 16' and the end surface 83 may be welded and the outer circumference of the joint face between the flange 82 and the end surface 83 can be sealed with an aluminum tape, etc. The end surface 83, where the flange 82 is fixed, prevents the igniting means from being pushed out by the gas pressure in the combustion chamber 84. The step 48 provides rigidity to the housing, especially to the closure shell circular area 71 that forms its bottom area. In the concavity 73, a connector bottom surface 85 of the ignitor is positioned more toward the inside than the outer surface of the circular area 71. The bent area 75 also provides rigidity to the edge of the central opening 74.

The flange area 86 of the diffuser shell and the flange area 87 of the closure shell overlap in the vicinity of the central cross-section in the axial direction of the housing. The diffuser shell 61 and the closure shell 62 are joined by laser welding 88 to form the housing 63. These flange areas 86 and 87 provide rigidity to the outer circumferential wall 68 of the housing to prevent deformation of the housing due to gas pressure.

The igniter 64 is a conventional electrical type igniter that is activated by a signal from the sensor (not shown in the figure). Since the electrical type igniter does not employ a mechanical method, but has a simple structure and is small in size and lightweight, it is preferable to the mechanical type igniter. This igniter 64 (e.g., output: 300–1500 psi in a 10 cc shut-in pressure container) is not provided with the transfer charge container 53, shown in FIG. 1, or the like. This is due to the good igniting and combustion characteristics of the gas generating agents 66. The gas generating agent 66 has a shape of a hollow cylinder. Because of this, combustion occurs at the outer and inner surfaces. As the combustion progresses, the surface area of the entire gas generating agent changes very little; this is an advantage.

The coolant/filter 67 is positioned to be concentric with the central hole 74, and along with the housing 63, it partitions to form the combustion chamber 84. This coolant/filter 67 is formed by overlaying a plain stitched, stainless steel wire mesh in the radial direction, and compressing this in the radial and axial directions. By means of this coolant/filter 67, the combustion chamber 84 is formed by partitioning. The combustion gas generated in the combustion chamber is cooled and the combustion residue in the combustion gas is collected by the coolant/filter 67. The outer layer 89, composed of a laminated wire mesh form, is formed on the outer side of this coolant/filter 67. This outer layer 89 functions to reinforce the coolant/filter as well as to cool the gas.

Since the closure shell is press-molded, the tilted area 90 is naturally formed in the circumferential direction, enclosing its circular area 71. This tilted area 90 functions as a means for positioning the coolant/filter 67 or to prevent its movement. It also functions as a means to form the plenum 69 between the housing's outer circumferential wall 68 and the outer layer 89 of the coolant/filter.

Many solid gas generating agents 66, each of which are hollow cylinders in shape, are provided in the combustion chamber 84. The gas generating agents 66 directly fill the space in the combustion chamber and are placed adjacent to the igniter 64. Their movements are restricted by the circular area 92 of the plate member which blocks opening 45 of one end of the coolant filter 67. The plate member 91 has the above-mentioned circular area 92 and the circumferential wall area 93, which is incorporated into the above-mentioned circular area 92, and which directly contacts the inner circumferential surface of one end of the coolant filter 67 to cover said inner circumferential surface. By means of this plate member 91, short-passing of the combustion gas between the end surface 94 of one end of the coolant/filter and the inner surface of the diffuser shell circular area 78 is prevented. The end surface 95 of the other end of the coolant/filter, where the plate member 91 is not provided, is fixed to a housing inner surface 46 by welding. Because of this, short-passing at the end surface 95 is prevented. Because of welding, a flame retardant and elastic packing, for instance made of silicon rubber, becomes unnecessary. This is normally provided between the coolant/filter end surface and housing inner surface.

The plenum 69 is formed between the outer circumferential wall 68 of the housing and the outer layer 89 of the coolant/filter, and this plenum 69 forms a gas channel around the coolant/filter 67 whose cross-section in the radial direction is ring-shaped. As in the gas generator shown in FIG. 1, the area at the radial direction cross-section of the gas channel is made greater than the total sum of the opening area of each gas discharge port 77 of the diffuser shell. Due to the existence of the gas channel around the coolant/filter, the combustion gas passes through the entire region of the coolant/filter and moves toward the gas channel. Because of this, effective use of the coolant/filter and effective cooling and purifying of the combustion gas are achieved. The cooled and purified combustion gas passes through the above-mentioned gas channel and reaches the gas discharge ports 77 in the diffuser shell. In order to prevent outside moisture from entering the inside of the housing 63, the gas discharge ports 77 in the diffuser shell are sealed with an aluminum tape 96 from the inner side of the housing.

When assembling this gas generator, for instance, the igniter 64 is fitted into the cylindrical collar member 100'. The igniting means attaching member 16' is attached to the central opening 74 of the closure shell 62. The cylindrical collar member 100' is fitted into the cylindrical inner circumferential surface 103' of said igniting means attaching member 16'. The lower opening of said igniting means attaching member 16' is crimped to fix the cylindrical collar member 100' in igniting means attaching member 16'. With the circular area 78 of the diffuser shell 61 placed at its bottom, the coolant/filter 67 is provided inside it. The inner side of this is filled with solid gas generating agents 66, after which the plate member 91 is placed over it. Finally, the closure shell to which the above-mentioned igniting means has been fixed is put on. The flange area 86 is overlaid in the flange area 87 of the closure shell. This is provided with laser welding 88 to join the diffuser shell 61 and the closure shell 62. Incidentally, regarding the means to fix the cylindrical collar member 100' inside igniting means attaching member 16', aside from this, the cylindrical collar member 100', which has been fitted into the cylindrical inner circumferential surface 103' of the igniting means attaching member 16', can be supported and fixed by a ring 150 which is fitted or screwed into a separate cylindrical inner circumferential surface 103', as shown in FIG. 3(a). Or, the cylindrical collar member 100' fitted into the cylindrical inner circumferential surface 103' of the igniting means attaching member 16' can be supported and fixed by a separately formed support member 151 which is fitted or screwed into the outer circumference of said igniting means attaching member 16' as shown in FIG. 3(b).

In the gas generator having this structure, when the sensor (not shown in the figure) senses an impact, its signal is sent to the igniter 64 to activate the igniter 64. This ignites the gas generating agents 66 inside the combustion chamber 84. Because of this, the gas generating agents burn and produce a high-temperature/high-pressure gas. This combustion gas enters the coolant/filter 67 from the entire region of the coolant/filter 67 and passes through the coolant/filter 67, during which period it is cooled and its combustion residue collected. The combustion gas which has been cooled and purified passes through the gas channel formed by the plenum 69, ruptures the wall of the aluminum tape 96, ejects from the gas discharge ports 77, and flows into the air bag (not shown in the figure). Because of this, the air bag inflates and forms a cushion between a passenger and hard structures, protecting the passenger from the impact. The space between the igniting means attaching member 16' and the cylindrical collar member 100' are sealed by the O-ring 102' provided inside the groove 101' on the outer circumference of said cylindrical collar member 100'. Also, the above-mentioned rib form 79 of the diffuser shell circular area and the above-mentioned step 48 and the bent area 75 of the closure shell circular area provide rigidity to the ceiling and bottom areas of the housing to prevent deformation of the housing due to gas pressure. The flange areas 86 and 87, which overlap and join in the vicinity of the central cross-section in the axial direction of the housing, provide rigidity to the outer circumferential wall 68 of the housing to prevent deformation of the housing due to gas pressure. Moreover, when a gap is created at the end surface of the coolant/filter, short-passing of the combustion gas is prevented by the above-mentioned plate member 91. Since the end surface 95 on the opposite side is fixed to the housing inner surface by welding, no gap is created between these two.

The seal mechanism via the combination of the above-mentioned groove and seal member can be applied to a gas generator for an air bag which is appropriately provided for a passenger side that is long in the axial direction, as shown in FIG. 4.

That is, the gas generator for an air bag shown in FIG. 4 has a cylindrical shape that is longer in the axial direction. Its housing 301 is formed by inserting a round-shaped tip area 332 of a cup-shaped member 303, that has been formed approximately into a cup shape, into the other end opening 323 of a cylindrical member 302, which has been formed approximately into a cylindrical shape, and then welding these two into a single form.

The cylindrical member 302 is approximately cylindrical in shape. At its one end side surface 321, a central opening 326, which contains the igniting means, is formed. Said central opening 326 is bent along the axial direction of the housing 301 so as to have an igniting means securing area 327. The circumferential wall 322 of the cylindrical member 302 is provided with the gas discharge ports 328 positioned in the circumferential and axial directions and a crank-shaped area 324 which forms an expanded circumferential wall area 325 where said circumferential wall 322 expands in the radial direction.

A cup-shaped member 303 is composed of a side end plane area 331, which faces one end side surface 321 of the cylindrical member 302, and a round tip area 332, which is incorporated into the peripheral edge of said side end plane area 331 and inserted into the other end opening 323 of the cylindrical member 302. At the center of this cup-shaped member 303's side end plane area 331, a gas generator attaching member 333, which extends in the axial direction of said cup-shaped member 303, is also formed.

The housing 301 formed in this manner contains, as needed: filter means placed with its outer circumference facing the inner side of the circumferential wall surface of the housing 301, i.e., a coolant/filter 305; a punching plate 306, which encloses the outer circumference of said coolant/filter 305 and prevents its deformation; an igniter 304, which functions as igniting means that is activated upon sensing an impact; a gas generating means, which is ignited by said igniting means and generates combustion gas, i.e., gas generating agents 307; and a cushion member 309, which supports said gas generating means. In order to prevent outside moisture from entering the housing, an aluminum tape 310 is attached to gas discharge ports 328 of the cylindrical member 302 to seal said gas discharge ports 328.

An initiator collar 350 is provided at the lower area of above-mentioned igniter 304, and a groove 351 provided in the circumferential direction is formed around said initiator collar, with an O-ring 352 being installed by pressing it inside said groove. As a result, said O-ring can securely seal the gap existing between the inner circumferential surface of the igniting means securing area formed at the central opening 326 and the outer circumferential surface of the initiator collar 350.

In the embodiment shown in this figure, a crank-shaped area 324 formed on the circumferential wall 322 of above-mentioned cylindrical member 302 is designed to have an expanded circumferential wall area 325 expand only by the thickness of the round tip area 332 of the cup-shaped member 303 in the radial direction of the cylindrical member 302, so that the above-mentioned coolant/filter 305 is supported by the inner surface of the circumferential wall 322—except for the expanded circumferential wall area 325 of the cylindrical member 302—and the inner surface of the round tip area 332 of the cup-shaped member 303, and forms a plenum 308 between the circumferential wall inner surface of the housing 301 and the filter means 305. Since this plenum 308 functions as a gas channel, the generated gas can pass through the entire region of the coolant/filter 305, and is effectively cooled and purified.

This gas generator is assembled by first putting the igniter 304, the punching plate 306, the coolant/filter 305, and the gas generating agents 307 into the cylindrical member 302, and then closing up the other end opening of said cylindrical member by the cup-shaped member 303. In a gas generator formed in this manner, when the sensor (not shown in the figure) senses an impact, its signal is sent to the igniter 304 to activate said igniter 304. Because of this, the gas generating agents 307 are ignited and burn and generate the combustion gas. Since the plenum 308 formed on the outer side of the coolant/filter 305 functions as the gas channel, this combustion gas passes through the entire region of said coolant/filter 305, during which period it is effectively cooled or its combustion residue collected. It ruptures the wall of aluminum tape 310 attached over the gas discharge ports 328 and is ejected from said gas discharge ports 328. This ejected gas flows into the air bag (not shown in the figure) to inflate said bag. It forms a cushion between a passenger and hard structures.

FIG. 5 shows an embodiment of this invention's air bag system constituted to include a gas generator using the electrical ignition type igniting means. This air bag system consists of a gas generator 200, an impact sensor 201, a control unit 202, a module case 203, and an air bag 204.

The gas generator explained according to FIG. 1 is used as the gas generator 200, and the area where the igniting means is provided is securely sealed by a combination of a groove provided in the cylindrical collar and an O-ring.

The impact sensor 201 is composed of, for instance, a semiconductor type acceleration sensor. This semiconductor type acceleration sensor has four semiconductor strain gauges formed on the silicon substrate's beam, which is designed to be deflected when accelerating. These semiconductor strain gauges are bridge connected. When acceleration occurs, the beam is deflected and the surface is strained. Because of this strain, the resistance of the semiconductor strain gauges changes, and this change of resistance is detected as a voltage signal that is proportional to the acceleration.

The control unit 202 has an ignition evaluation circuit, and the signal from the above-mentioned semiconductor type acceleration sensor is put into this ignition evaluation circuit. The control unit 202 begins its calculation at the point at which this impact signal exceeds a certain value. It outputs the activation signal to the igniter 4 of gas generator 200 when the calculation result exceeds a certain value.

The module case 203, made of polyurethane, for example, includes a module cover 205. The air bag 204 and the gas generator 200 are installed inside the module case 203 to constitute a pad module. This pad module is attached to a steering wheel 207 of an automobile.

The air bag 204 is formed of nylon (nylon 66, for example), or polyester, etc., and fixed to the flange area of the gas generator, with the air bag opening 206 enclosing the gas discharge ports of the gas generator while being folded.

When semiconductor acceleration sensor 201 senses an impact at the time of an automobile collision, its signal is transmitted to the control unit 202, and the control unit 202 begins its calculation at the point at which the impact signal from the sensor exceeds a certain value. It outputs the activation signal to the igniter 4 of the gas generator 200 when the calculation result exceeds a certain value. Because of this, the igniter 4 is activated to ignite the gas generating agents, which then burn and generate a gas. This gas is ejected into the air bag 204, whereby the air bag breaks the module cover 205 and inflates, forming a cushion that absorbs an impact between the steering wheel 207 and a passenger.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

We claim:

1. A gas generator for an air bag, comprising:
   a housing having gas discharge ports;
   an igniter provided within said housing and activated upon an impact;
   a cylindrical collar member provided on an outer circumference of said igniter, said collar member having a groove in an inner and an outer surfaces in a circumferential direction thereof;
   an igniter attaching member provided within said housing having a cylindrical inner surface for receiving said collar member therein; and
   a seal member provided in said groove in order to prevent a fluid communication between inside and outside of said housing.

2. The gas generator of claim 1, wherein said groove is provided in the inner surface of the collar member where said ignitor engages and said seal member is press-fitted in said groove.

3. The gas generator of claim 1, wherein said seal member seals a space created between the cylindrical collar member and said ignitor, and between the cylindrical collar member and said ignitor attaching member.

4. The gas generator of claim 1, wherein said housing has an attachment opening in a bottom surface thereof, and said housing contains and secures said ignitor attaching member in said attachment opening.

5. The gas generator of claim 4, wherein said groove is provided in the outer surface of the collar member where said ignitor attaching member engages, and said seal member is press-fitted in said groove.

6. The gas generator of claim 1, wherein said ignitor attaching member is an inner cylinder adapted to partition an inner space of said housing into at least two chambers, said ignitor attaching member being substantially cylindrical in shape and one end of which being attached to the inner surface to an upper portion of said housing.

7. The gas generator of claim 1, wherein said ignitor attaching member is substantially cylindrical in shape and has an insufficient length to partition an inner space of said housing.

8. The gas generator of claim 1, wherein said ignitor is an electrical-type ignitor.

9. The gas generator of claim 1, wherein said ignitor is a mechanical-type ignitor.

10. The gas generator of claim 1, wherein said seal member is an O-ring.

11. The gas generator of claim 1, wherein said seal member is a packing.

12. A gas generator for an air bag, comprising:
    a housing having gas discharge ports;
    an inner cylinder provided within said housing for partitioning an inner space of said housing into at least two chambers;

a mechanical-type igniter activated upon an impact, said ignitor having a groove in a circumferential direction thereof at a position facing an inner surface of said inner cylinder; and a seal member provided in said groove such that said seal member prevents a fluid communication between inside and outside of said housing.

13. An air bag system, comprising:

an air bag inflated by a gas generated by a gas generator;

a module adapted to install said air bag, said gas generator including, a housing having gas discharge ports;

an igniter provided within said housing and activated upon an impact;

a cylindrical collar member provided on an outer circumference of said ignitor, said collar member having a groove in an inner and an outer surfaces in a circumferential direction thereof;

an ignitor attaching member provided within said housing having a cylindrical inner surface for receiving said collar member therein; and a seal member provided in said groove in order to prevent a fluid communication between inside and outside of said housing.

14. A gas generator for an air bag, comprising:

a housing having gas discharge ports;

an igniter provided within said housing and activated upon an impact;

a cylindrical collar member provided on an outer circumference of said igniter, said collar member having a groove in an inner surface in a circumferential direction thereof; and a seal member provided in said groove in order to prevent a fluid communication between inside and outside of said housing.

15. The gas generator of claim 14, wherein said groove is provided in the inner surface of the collar member where said ignitor engages and said seal member is press-fitted in said groove.

16. The gas generator of claim 15, wherein said seal member seals a space created between the cylindrical collar member and said ignitor.

17. The gas generator of claim 14, wherein said ignitor is an electrical-type ignitor.

18. The gas generator of claim 14, wherein said ignitor is a mechanical-type ignitor.

19. The gas generator of claim 14, wherein said seal member is an O-ring.

20. The gas generator of claim 14, wherein said seal member is a packing.

21. An air bag system, comprising:

an air bag inflated by a gas generated by a gas generator;

a module adapted to install said air bag; said gas generator including, a housing having gas discharge ports;

an igniter provided within said housing and activated upon an impact;

a cylindrical collar member having a groove on an outer circumference of said igniter, said collar member having a groove in an inner surface in a circumferential direction thereof;

an ignitor attaching member provided within said housing having a cylindrical inner surface for receiving the cylindrical collar member therein; and a seal member provided and press-fitted in said groove in order to prevent a fluid communication between inside and outside of said housing.

* * * * *